United States Patent [19]

Wombwell et al.

[11] Patent Number: 5,451,362
[45] Date of Patent: Sep. 19, 1995

[54] MOULDING PROCESS

[75] Inventors: Paul T. Wombwell, Royston; Richard J. Martin, Cambridge; Christopher H. Bull, Cambridge, all of England

[73] Assignee: Ciba-Geigy Corporation, Ardsley, N.Y.

[21] Appl. No.: 154,201

[22] Filed: Nov. 18, 1993

[30] Foreign Application Priority Data

Nov. 27, 1992 [GB] United Kingdom ............... 9224854

[51] Int. Cl.⁶ ............................................. B29C 45/73
[52] U.S. Cl. ............................. 264/328.6; 264/102; 264/328.8; 264/328.16; 264/328.18; 264/331.12; 264/349
[58] Field of Search ................... 264/328.16, 331.12, 264/331.21, 349, 328.13, 328.18, 328.6, 102, 328.8

[56] References Cited

U.S. PATENT DOCUMENTS

| | | |
|---|---|---|
| 3,063,965 | 11/1962 | Colclongh . |
| 3,777,000 | 12/1973 | Kusenberg et al. . |
| 3,793,247 | 2/1974 | Fleming et al. . |
| 4,066,625 | 1/1978 | Bolger . |
| 4,657,992 | 4/1987 | Brennan et al. ............... 264/331.12 |
| 5,064,585 | 11/1991 | Cooper et al. ................ 264/328.18 |
| 5,104,604 | 4/1992 | Gallo ........................... 264/331.12 |
| 5,242,635 | 9/1993 | Matsumoto et al. .......... 264/331.12 |

FOREIGN PATENT DOCUMENTS

| | | |
|---|---|---|
| 0333456 | 9/1989 | European Pat. Off. . |
| 2019816 | 10/1970 | Germany . |
| 2139290 | 2/1972 | Germany . |
| 2025469 | 7/1975 | Germany . |
| 1318926 | 5/1973 | United Kingdom . |
| 1323343 | 7/1973 | United Kingdom . |
| 1367270 | 9/1974 | United Kingdom . |
| 1441075 | 6/1976 | United Kingdom . |

OTHER PUBLICATIONS

Derwent Abst. 88-216706.
Patent Abstracts of Japan, vol. 16, No. 76, JP3269011, Nov. 1991.
Patent Abstracts of Japan, vol. 12, No. 433, JP63161018, Jul. 1988.
Patent Abstracts of Japan, vol. 15, No. 313, JP3115423, May 1991.

Primary Examiner—Matheu D. Vargot
Attorney, Agent, or Firm—William A. Teoli, Jr.

[57] ABSTRACT

The present invention provides a process for making a cured plastics moulding by introducing a pre-heated curable resin composition to a hotter mould which is at a temperature high enough to initiate curing of the resin, and supplying further resin under pressure to compensate for shrinkage of the composition, wherein the curable resin is an epoxy resin formulation comprising an epoxy resin containing more than one epoxide group per molecule on average, an acid anhydride hardener, an accelerator and a filler, the epoxy resin, hardener and accelerator being chosen so that the formulation is stable at 25° C. for at least 14 days.

10 Claims, No Drawings

MOULDING PROCESS

BACKGROUND OF THE INVENTION

The present invention relates to a method of making a moulded plastics article, especially where the plastics is an epoxy resin cured with an anhydride hardener.

Epoxy resins can be used to make moulded articles by what is called the Automatic Pressure Gelation Process (APG). In this process which is described for example in GB 1323343 and EP 0333456 an epoxy resin and a curing agent are mixed at a temperature at which they are liquid, usually 40°-60° C. The mixture is then passed, under slight pressure, into a mould which is at a high enough temperature for gelling and curing to take place. Further mixture is supplied to the mould under the application of pressure to compensate for shrinkage of the composition until the composition has set.

Depending on whether a thick-walled or thin-walled casting is being made the technique is slightly different. In order to produce a thick-walled cured plastics moulding a pre-heated liquid casting resin composition which is capable of setting within a period of three to sixty minutes is poured into a preheated mould substantially without the application of pressure so as substantially to fill the mould, the temperature of the mould being sufficient to initiate curing of the resin composition and the temperature of the composition being at least 10% below the temperature of the mould, said temperatures being measured in degrees centigrade, the temperature of the mould and the temperature of the resin composition being selected such that the temperature in the centre of the moulding composition will not reach the temperature of the composition at the mould wall until the composition has set sufficiently to enable it to be removed from the mould, and further composition is supplied to the mould with the application of pressure for compensating for shrinkage of the composition until the composition has set, whereafter the set moulding is removed from the mould.

In order to produce a thin-walled cured plastics moulding a pre-heated and de-gassed resin composition capable of setting within sixty minutes is supplied under pressure to a mould cavity of the shape of the moulding in a hotter pre-heated mould so as substantially to fill the mould cavity, gases are exhausted from the mould cavity as it is filled and are restrained from entering into the mould cavity during setting of the composition, and further composition is supplied under pressure to the mould cavity until the composition has set so as to compensate for shrinking of the composition, wherein the composition is pre-heated to a temperature of 50°-120° C. and is supplied to the mould cavity under a pressure of at least 4 psi (280 g/cm$^2$), the maximum temperature of the mould cavity is 120°-170° C. and the temperature of the mould is controlled to maintain a substantially linearly increasing temperature profile in the composition away from the entry for the composition into the mould cavity to peripheral regions of the cavity remote from the entry, whereby setting of the composition progresses through the mould cavity from locations remote from the entry back to the entry.

The typical epoxy resin/anhydride casting resin system comprises about 25–45% by volume of epoxy resin, 12–30% by volume of anhydride hardener and 30–65% by volume of mineral filler, together with minor levels of cure accelerator and other additives. As supplied to the processor the composition may be preformulated to reduce the number of parts needing to be mixed prior to use. In practice 2-part compositions are most popular although 3- or even 4-part compositions are not uncommon.

There are numerous disadvantages to this general form of presentation of the resin system.

Compounding of multi component blends is costly of time and labour. It introduces a high risk of operator error, particularly since large numbers of small batches are likely to be required and also because some of the components are used in relatively small amounts. Furthermore, costly facilities are necessary to prevent health hazards from inhalation of mineral fillers.

If compounded as a two part blend, the system is most usually processed through an automatic metering and mixing machine. Such equipment reduces labour and the risk of operator error, but incurs substantial extra capital costs.

Compounding as a two-part system creates difficulties in achieving the high loading of mineral fillers desirable from both cost and technical considerations. The liquid resin component can accommodate only about half as much filler as can the overall resin-hardener mixture. On the other hand, filling the hardener component creates severe problems of settlement during storage because of the very low viscosity of the normally used liquid anhydrides. Furthermore, the separate filling of both resin and hardener is inefficient because it involves an additional processing step with concomitant costs.

When processing the resin to make a moulded article, the resin is first preheated in an oven at about 90° C. The hardener is then added and the mixture is then mixed under vacuum to de-aerate it. The mixing temperature may be about 65° C. and the resulting mixture has a usable life of about 3 hours at 65° C.

The mixture is then fed into a suitable mould and cured in the mould at 140°-190° C.

We have now found that it is possible to use a stable one-part system in the APG process which avoids the disadvantages of the conventional two or multi-part system and produces moulded articles at least as good.

SUMMARY OF THE INVENTION

Accordingly the present invention provides a process for making a cured plastics moulding by introducing a pre-heated curable resin composition to a hotter mould which is at a temperature high enough to initiate curing of the resin, and supplying further resin under pressure to compensate for shrinkage of the composition, wherein the curable resin is an epoxy resin formulation comprising an epoxy resin containing more than one epoxide group per molecule on average, an acid anhydride hardener, an accelerator and a filler, the epoxy resin, hardener and accelerator being chosen so that the formulation is stable at 25° C. for at least 14 days.

DETAILED DESCRIPTION

When carrying out the process of the invention, the viscosity of the casting mixture should be in the range of 1000–5000 mPa s. Higher viscosities would necessitate the use of injection pressures in excess of 3 bar (0.3 MPa) which create unacceptable technical and safety problems. For the compositions used according to the invention the usable life or storage life is defined in terms of stability at 25° C., and the time quoted is that needed for the composition to double in viscosity at 25°

C. Thus if a composition is said to be stable for 30 days at 25° C., this means that it takes 30 days for the viscosity to double at 25° C. This ensures that the compositions can be used in the process without needing to use the excessively high pressures mentioned above.

The curable epoxy resin formulation may be made by mixing the components in any order and at any temperature subject to two criteria, namely that the mixture viscosity can be accommodated by the mixer and that the temperature is substantially below the temperature of onset of the cure reaction. A margin of 50° C. is widely regarded as a desirable margin of safety in the latter respect.

A preferred process for producing a formulation containing a large amount of filler is to charge warm epoxy resin to a vessel, mix in any antioxidant and other minor additives, then about half of the filler, then all the hardener then, finally, all the remaining filler and catalyst (accelerator). The temperature may be allowed to fall as the filler and hardener are added.

It should be noted that the epoxy resin should be sufficiently hot for difficultly soluble additives to dissolve, for instance some antioxidants require a temperature of about 100° C. Also, in order to prevent premature reaction or reaction runaway, the mixture should be significantly lower in temperature than the activation temperature of the catalyst and the temperature of the walls of the vessel should also be at this lower level. Therefore the mixture should not be heated during or after addition of catalyst.

Accordingly, a more preferred process for producing a formulation comprises heating the epoxy resin to a temperature high enough to dissolve in antioxidant, dissolving this in the resin, adding about half the filler plus pigments and any other minor additives other than the catalyst and allowing the temperature to fall to about 50° C., adding the anhydride hardener, followed by the remaining filler, keeping the temperature at about 50° C., if necessary adjusting the temperature down to a level which ensures an adequate margin of safety between the mixture temperature and the activation temperature of the catalyst, and with the vessel unheated, adding the catalyst and stirring under vacuum until homogeneous.

The resulting mixture has a shelf life at 25° C. of at least 14 days and preferably at least 30 days. The shelf life is increased if the mixture is kept at a lower temperature, and is stable for several months if kept under refrigerated conditions.

Suitable epoxides include polyglycidyl esters, polyglycidyl ethers, and cycloaliphatic epoxides.

Epoxides which may be employed are preferably those containing, on average, more than one group of formula

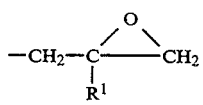

directly attached to an atom or atoms of oxygen or nitrogen, where $R^1$ denotes a hydrogen atom or a methyl group.

As examples of such epoxides may be mentioned polyglycidyl and poly(beta-methylglycidyl) esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g. oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)glycols, proparte-1,2-diol and poly(oxypropylene)glycols, proparte-1,3-diol, butane-1,4-diol, poly(oxytetramethylene) glycols, pentane-1,5-diol, hexane-1,6-diol, hexane-2,4,6-triol, glycerol, 1,1,1-trimethylol-proparte, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)proparte, and 1,1-bis(hydroxymethyl)cyclohex-3-ene; and from alcohols having aromatic nuclei, such as 2,4-(dihydroxymethyl)benzene. They may also be made from mononuclear phenols, such as resorcinol and hydroquinone, and from polynuclear phenols, such as bis(4-hydroxyphenyl)methane, 4,4'-dihydroxydiphenyl, 1,1,2,2-tetrakis(4-hydroxyphenyl)ethane, 2,2-bis(4-hydroxyphenyl)-proparte, 2,2-bis(3,5-dibromo-4-hydroxyphenyl)proparte, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert-butylphenol.

Epoxides in which some or all of the epoxide groups are not terminal may also be employed, such as vinylcyclohexane dioxide, limonene dioxide, dicyclopentadiene dioxide, 4-oxatetracyclo[6,2.1.0$^{2,7}$.0$^{3,5}$]undec-9-yl glycidyl ether, the bis(4-oxatetracyclo[6.2.1.0$^{2,7}$.0$^{3,5}$]undec-9-yl ether of ethylene glcyol, 3,4-epoxycyclohexylmethyl 3',4'-epoxycyclohexane carboxylate and its 6,6$^1$ dimethyl derivative, the bis(3,4-epoxycyclohexane-carboxylate) of ethylene glycol, 3-(3,4-epoxycyclohexyl)-8.9-epoxy-2,4-dioxaspire[5,5]undecane, and epoxidised butadienes or copolymers of butadiene with ethylenic compounds such as styrene and vinyl acetate.

Epoxide resins having the 1,2-epoxide groups attached to different kinds of hetero atoms may be employed, e.g. the glycidyl ether-glycidyl ester of salicylic acid. If desired, a mixture of epoxy resins may be used.

Preferred epoxides are polyglycidyl esters, polyglycidyl ethers of 2,2-bis(4-hydroxyphenyl)proparte, of bis(4-hydroxyphenyl)-methane or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, and 3,4-epoxycyclohexylmethyl 3',4'-epoxycyclohexane carboxylate.

The epoxy resin should be pure enough and have a low hydroxyl content so as to give stability in the presence of the hardener.

The hardener is preferably an acid anhydride. Suitable anhydrides are either liquid, or solids having a melting point of less than 50° C. Anhydride hardeners suitable for use include methyltetrahydrophthalic anhydrides, hexahydrophthalic anhydride, methylhexahydrophthalic anhydrides, methylendo methylenetetrahydrophthalic anhydrides, tetrahydrophthalic anhydride, phthalic anhydride, alkenylsuccinic anhydrides, maleic anhydride, succinic anhydride, glutaric anhydride or fumaric anhydride. Mixtures of such anhydrides may be used advantageously to depress the individual melting point and thereby repress crystallization of anhydride out of the one part casting mixture.

The anhydride hardener should have a low acid content in order to ensure stability of the formulation.

The accelerator may be any that enables the final mixture to have a shelf life of at least 14 days at 25° C. In order to achieve this, the accelerator should only become active at a temperature of at least 50° C. Thus the accelerator may be a latent accelerator or a non-latent accelerator which is protected by microencapsulation in heat sensitive barriers or by adsorption into molecular sieves.

Suitable latent accelerators include boron trihalide complexes of alkyldimethylamines having 1 to 18 carbon atoms in the alkyl groups, for example trimethylamine or n-decyldimethylamine or of aralkyldimethylamines, for example benzyldimethylamine. The boron trihalide is preferably boron trichloride, other suitable accelerators include quaternary ammonium or phosphonium salts, complexes of heavy metal carboxylates with imidazoles, or non-latent amine or imidazole accelerators protected by microencapsulation in heat sensitive barriers or by adsorption into molecular seives.

The filler is preferably one having a density similar to that of the rest of the mixture in order to minimise any settling or flotation. A wide range of fillers may be used, both fine and coarse particles. The filler may be inorganic such as china clay, calcined china clay, quartz flour, cristobalite, chalk, mica powder, glass powder, glass beads, powdered glass fibre, aluminium oxide and magnesium hydroxide, or organic such as powdered poly(vinyl chloride), nylon, polyethylene, polyester or cured epoxy resin. Flame retardant fillers such as trihydrated aluminium may also be used.

Mixtures of fillers may be used. For example in order to give a granite-like effect in a moulder product a mixture of calcined china clay and black mica of relatively large particle size may be used, for instance about 0.5 mm.

The filler may also have its surface treated with a silane or organotitanate coupling agent.

In general fillers having a particle size of from 10 to 3,000 microns may be used, preferably from 50 to 1000 microns. The amount of filler may be from 20–65% by volume of the total mixture, preferably from 40–60% by volume.

The maximum viscosity of the resulting mixture is preferably 25 Pa s at 50° C.

In order to assist in preventing any settling of the filler, a thixotropic agent may be added, but preferably in an amount less than is required to make the mixture thixotropic.

Suitable thixotropic agents include highly dispersed silicas, bentonite and silicates or organic compounds such as hydrogenated castor oil. The thixotropic agent is used in an amount less than that necessary to impart thixotropic properties to the resin. It may be used in amounts of from 0.5 to 10 parts by weight per 100 parts by weight of epoxy resin, preferably 1 to 3 parts by weight.

At higher temperatures such as those reached just prior to gelling in a mould, the viscosity of the mixture decreases and the thixotropic agent alone is insufficient to prevent the filler from settling. Its performance may be enhanced by the use of a polymer which dissolves in and thickens the hot mixture of epoxy resin and curing agent. This thickening prevents the filler from settling at temperatures up to the gelling temperature of the mixture.

Any polymer which is soluble in the hot mixture and enhances the effect of the thixotropic agent may be used. Examples of suitable polymers include poly(vinyl butyrals), polyoxyethylenes, poly(vinyl formals), polycaprolactones and polyamides. The polymer may be used in amounts of from 0.5 to 20 parts by weight per 100 parts by weight of epoxy resin, preferably from 1 to 3 parts by weight.

Other additives conventionally employed in moulding resin compositions may also be included in the composition. Examples of such additives are pigments, dyes, fibres such as glass and carbon fibres, flame retardants, antioxidants, light stabilisers, UV absorbers, surfactants, anti-foaming agents, toughening agents such as rubbers and core-shell polymers, and other stabilisers such as lower carboxylic acids.

Examples of suitable antioxidants include alkylated monophenols, alkylthiomethylphenols, hydroquinones and alkylated hydroquinones, hydroxylated thiodiphenyl ethers, alkylidenebisphonols, O-, N- and S-benzyl compounds, hydroxybenzylated malonates, hydroxybenzyl aromatics, triazine compounds, benzylphosphonates, acylaminophenols, esters and amides of $\beta$-(3,5-di-tert-butyl-4-hydroxyphenyl)propionic acid, esters of $\beta$-(5-tert-butyl-4-hydroxy-3-methylphenyl)propionic acid, esters of $\beta$-(3,5-dicyclohexyl-4-hydroxyphenyl)propionic acid and esters of 3,5-di-tert-butyl-4-hydroxyphenyl acetic acid.

Examples of suitable UV absorbers and light stabilisers include 2-(2'-hydroxyphenyl)benzotriazoles, 2-hydroxybenzophenones, esters of substituted and unsubstituted benzoic acids, acrylates, nickel compounds, sterically hindered amines, oxalic acid diamides and 2-(2-hydroxyphenyl)-1,3,5-trizines.

When making the compositions according to the invention, the ingredients other than the hardener acid the accelerator are preferably added to the resin at elevated temperature at the beginning of the process.

When carrying out the process of the invention, there is no inherent hazard due to any exotherm because of the use of large amounts of filler. The high filler loading also means that there is less shrinkage when casting, the resulting cast product is harder, and the colour stability is better. In addition there is higher thermal conductivity when used in electrical applications.

The process of the invention may be used for the production of mouldings having thin or thick walls (cross sections). They are also particularly suitable for the production of mouldings having a large surface area, at least one large linear dimension or a complex shape. The compositions may be used, for instance, in the moulding of domestic sanitary ware such as sinks, baths, shower trays and basins, sheet slabstock for use in the production of articles such as domestic workshops, chemically resistant containers such as tanks and parts such as pumps, valves and pipes for handling corrosive fluids and impact-resistant mouldings for use in cars and other vehicles, and electrical applications.

When used to make a moulding no further mixing is required. It is only necessary for the user to preheat the mixture, e.g. to a temperature of 40° C. and then pump it directly to the mould.

There is no need for a de-aeration step. At a temperature of 40° C., the mixture has a usable life of about 48 hours.

The invention is illustrated by the following Example in which "parts" are parts by weight.

EXAMPLE

A diglycidyl ether of bisphenol A, having an epoxide content of 5.2 equivalents/Kg (100 parts) is heated to 100° C. A hindered phenol antioxidant (2.0 parts) is added to the hot diglycidyl ether of bisphenol A and the mixture stirred until the antioxidant has dissolved. Antifoam A, a proprietary air release agent, (0.1 parts); titanium dioxide (4.0 parts); A proprietary stearate treated calcium carbonate (10 parts); a proprietary calcined china clay (150 parts) are added and the temperature adjusted to 50° C. Methyltetrahydrophthalic anhydride (85 parts) is added, then further calcined china clay (160 parts) is incorporated under vacuum. With the temperature at 50° C. and vessel heating discontinued, a boron trichloride/N-octyldimethylamine complex (1 part) is incorporated under vacuum until the mixture is homogeneous. The mixture is then allowed to cool to give a storage stable formulation having a shelf life of 30 days at 25° C.

When moulded by the APG process to produce kitchen sinks, good sinks are obtained.

We claim:

1. A process for making a cured plastics moulding by introducing a pre-heated curable resin composition to a hotter mould which is at a temperature high enough to initiate curing of the resin, and supplying further resin under pressure to compensate for shrinkage of the composition, wherein the curable resin is an epoxy resin formulation comprising an epoxy resin containing more than one epoxide group per molecule on average, an acid anhydride hardener, an accelerator and a filler, the epoxy resin, hardener and accelerator being chosen so that the formulation is stable at 25° C. for at least 14 days; wherein said curable epoxy resin formulation is made by heating an epoxy resin containing more than one epoxy group per molecule on average at an elevated temperature at which the resin is liquid, mixing in any antioxidant and other minor additives, then about half of the filler, then all the hardener, and then finally all the remaining filler and accelerator.

2. A process as claimed in claim 1 in which the curable epoxy resin formulation is made by a process which comprises heating the epoxy resin to a temperature high enough to dissolve the antioxidant, dissolving this in the resin, adding about haft the filler plus pigments and any other minor additives other than the accelerator and allowing the temperature to fall to about 50° C., adding the anhydride hardener, followed by the remaining filler, keeping the temperature at about 50° C., if necessary adjusting the temperature down to a level which ensures an adequate margin of safety between the mixture temperature and the activation temperature of the accelerator, and with the vessel unheated, adding the accelerator and stirring under vacuum until homogeneous.

3. A process as claimed in claim 1 in which the epoxy resin is a polyglycidyl ester, polyglycidyl ether, or cycloaliphatic epoxide.

4. A process as claimed in claim 1 in which the hardener is an acid anhydride.

5. A process as claimed in claim 1 in which the accelerator is one which only becomes active at at least 50° C.

6. A process as claimed in claim 5 in which the accelerator is selected from a latent accelerator or a non-latent accelerator each of which is protected by microencapsulation in a heat sensitive barrier or by adsorption into a molecular sieve.

7. A process as claimed in claim 6 in which the accelerator is a boron trihalide complex of an alkyldimethylamine having 1 to 18 carbon atoms in the alkyl group or an aralkyldimethylamine.

8. A process as claimed in claim 1 in which the amount of filler is from 20–65% by volume of the total mixture.

9. A process as claimed in claim 8 in which the amount of filler is from 40–60% by volume of the total mixture.

10. A process as claimed in claim 1 in which the resin formulation also contains a pigment, dye, glass fibres, carbon fibres, a flame retardant, antioxidant, light stabiliser, UV absorber, surfactant, anti-foaming agent, toughening agent and/or a lower carboxylic acid.

* * * * *